Dec. 8, 1936.   C. O. FAIRCHILD ET AL   2,063,840
MOISTURE TESTING DEVICE
Filed Aug. 25, 1933   2 Sheets-Sheet 1
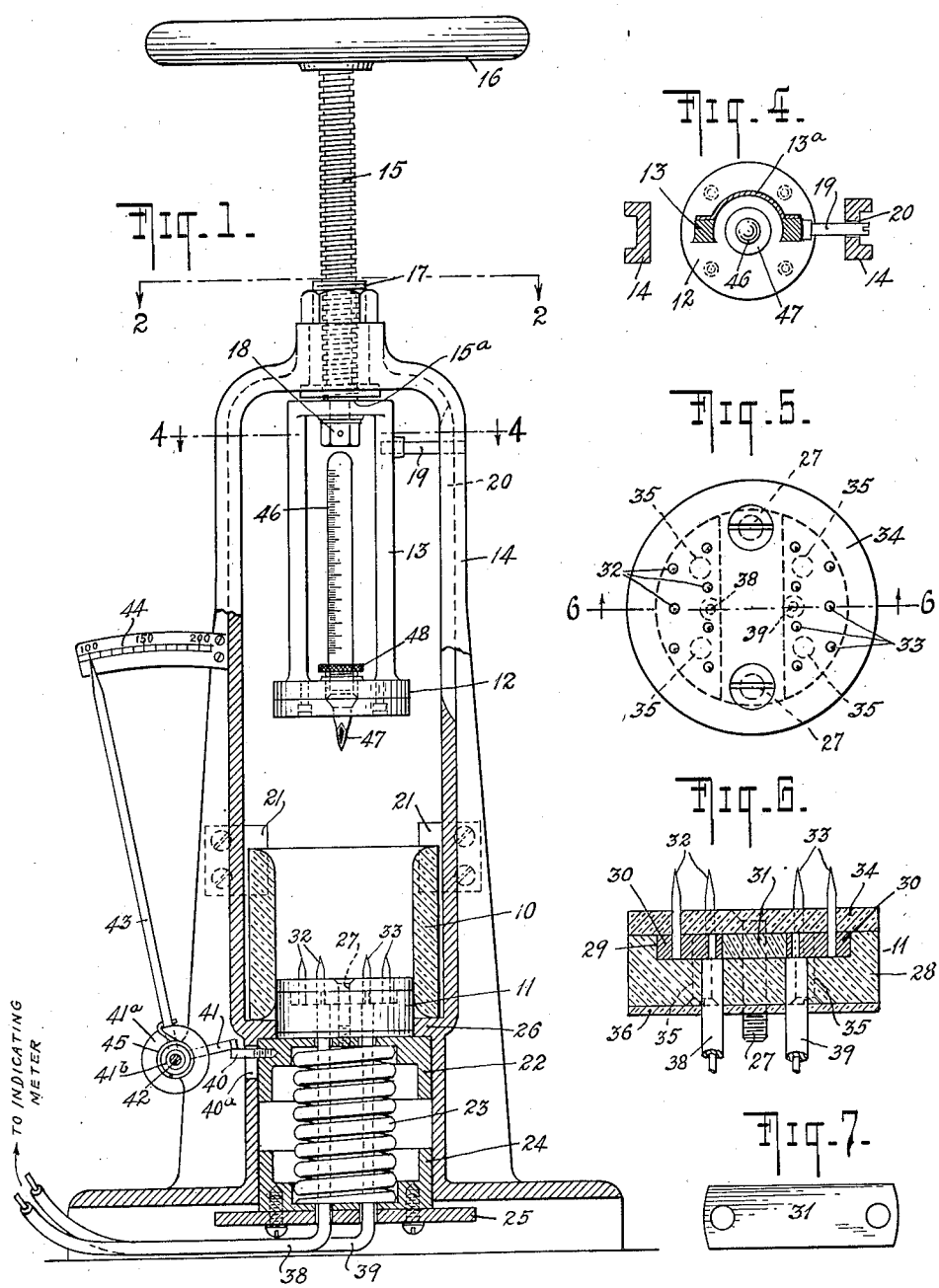
WITNESS
G. V. Rasmussen
INVENTORS
CHARLES O. FAIRCHILD
JAMES P. HENDERSON
BY
Bresen Schrenk
ATTORNEYS Dec. 8, 1936.  C. O. FAIRCHILD ET AL  2,063,840
MOISTURE TESTING DEVICE
Filed Aug. 25, 1933   2 Sheets-Sheet 2
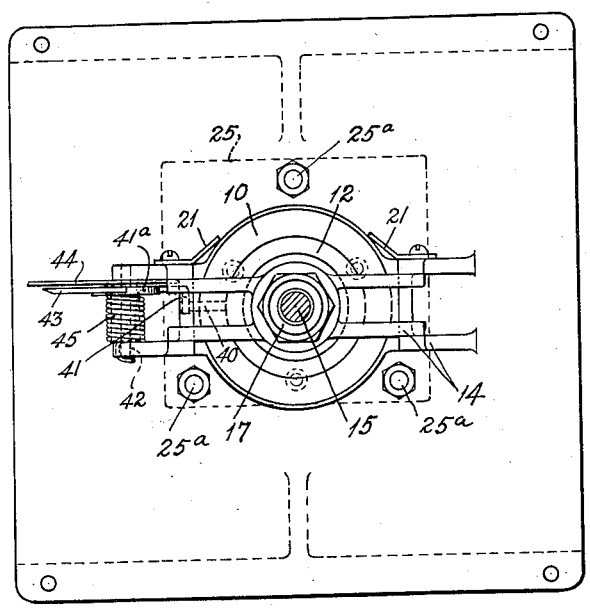
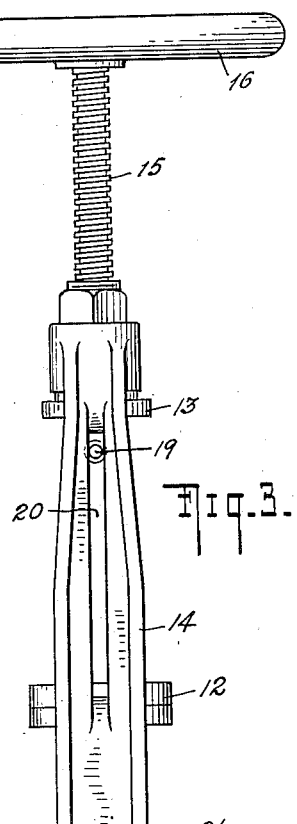
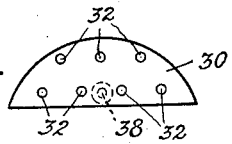
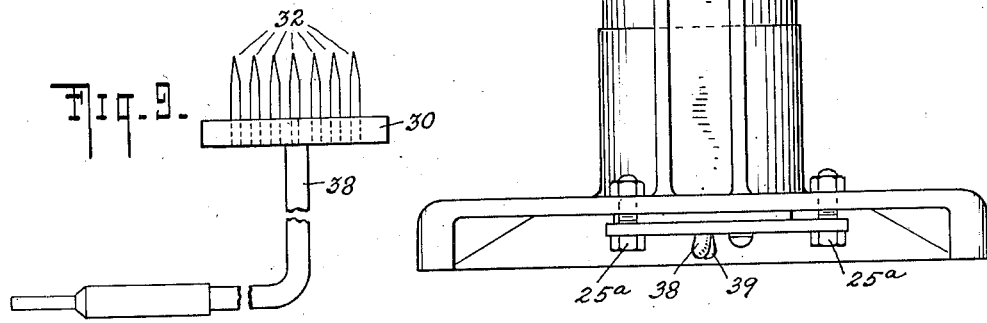
WITNESS
G. V. Rasmussen
BY
INVENTORS
CHARLES O. FAIRCHILD
JAMES P. HENDERSON
ATTORNEYS Patented Dec. 8, 1936

2,063,840

UNITED STATES PATENT OFFICE 2,063,840

MOISTURE TESTING DEVICE

Charles O. Fairchild, St. Albans, and James P. Henderson, Brooklyn, N. Y., assignors to Charles J. Tagliabue Mfg. Co., Brooklyn, N. Y., a corporation of New York Application August 25, 1933, Serial No. 686,670

23 Claims. (Cl. 175—183)

The present invention relates to an improved method and mechanism for testing the moisture content of various kinds of materials, especially of fibrous, comminuted, granular, or loose material, for example cut tobacco.

It is an object of the present invention to provide an apparatus of the type specified wherewith the moisture content of a loose or comminuted material can be speedily ascertained with sufficient accuracy in a very convenient manner. It is also an object of the invention to provide a moisture testing device by the aid of which the testing of various samples may be readily accomplished under substantially similar or standard conditions.

More specifically it is an object of the invention to provide mechanism for accurately determining the moisture content of loose or comminuted material by measurement of the electrical resistance of such material. It is one of the important features of the invention that a number of metallic needles are used as electrodes, and means are provided to compress the material to be tested about such electrodes to such a degree that a large and uniform area of contact between the electrodes and the material may be established for successive samples. In this way substantially the same conditions of contact and density of material about the electrodes are obtained so that the test results may reliably be compared with the results obtained with samples of known moisture content and employed as standards, or substituted in an empirical formula derived from such standards.

Other objects and advantages of the invention will appear from the following description and the features of novelty will be set forth in the appended claims.

Our improved mechanism is of particular utility in connection with the testing of the moisture content of tobacco, especially cut tobacco, such as that employed in the manufacture of cigarettes, although leaf tobacco and many other substances such as unspun cotton, paper, excelsior, wood, flour, bran, wool, felt, shredded leather, seeds, tempered wheat, etc., can be similarly tested.

The accompanying drawings show by way of example a preferred embodiment of the invention which may be used for determining the moisture content of cut tobacco. In said drawings, Fig. 1 is an elevation partly in section of our improved moisture testing device; Fig. 2 is a horizontal section taken along the line 2—2 of Fig. 1; Fig. 3 is an end view of the device; Fig. 4 is a horizontal section along the line 4—4 of Fig. 1; Fig. 5 shows a somewhat enlarged plan view of the electrode holder and the electrodes; Fig. 6 is a vertical section along the line 6—6 of Fig. 5 and shows the manner in which the two sets of electrodes are completely insulated from each other. Fig. 7 is a detail illustrating the insulating bar between the two electrodes; and Figs. 8 and 9 are details showing the construction of the electrodes.

The moisture testing mechanism includes means for bringing a sample of loose, comminuted, fibrous or shredded material, specifically cut tobacco, into a state of compression of a predetermined or constant degree before the same is subjected to the test for moisture content. According to the embodiment of the invention illustrated there is provided a hollow retaining sleeve or ring 10 of non-conducting material which is adapted to fit about a lower piston 11 and to receive a movable upper piston 12 whose lower portion at least, like the ring 10, is made of a non-conducting material, such as a resinous moulding composition, hard rubber, etc. The upper piston is mounted upon a spider frame 13 supported within an upright frame 14 through which passes a screw 15 operated by a hand wheel 16, the screw being received in an internally threaded sleeve 17. A shoulder 15$^a$ formed by reducing the lower end of the screw engages the upper portion of the frame 13 through which the unthreaded reduced end of the screw freely passes, while a fixed nut 18 engages the under side of the top portion of such frame, so that upon rotation of the hand wheel 16 in the one or other direction, the frame 13 and with it the piston 12 are moved up or down. The frame 13 is provided with a guide pin 19 which may be in the form of a screw and engages within a slot 20 in one side of the upright frame 14, whereby the frame 13 is held against rotation during operation of the hand wheel 16, the movement of the frame 13 being thus rectilinear only. The back stop plates 21 serve as guides for expeditiously placing the ring 10 over the piston 11.

The bottom piston 11 rests upon a socket member 22 which receives the upper end of a compression spring 23 whose lower end is supported within a socket member 24 adjustably fixed to the frame 14 through a plate 25 which is fastened to such frame by bolts 25$^a$ (Fig. 2). The downward movement of the sleeve or ring 10 is limited by a shoulder 26 projecting inwardly of the frame 14, the shoulder having an internal diameter substantially equal to the external diameter of the lower piston 11 so that the latter may slide within such ring. The piston 11 is secured to the socket 22 by screws 27.

The lower piston 11 carries the two sets of electrodes by means of which the electrical resistance of a sample of material is tested. As shown in greater detail in Figs. 5 to 9, the piston 11 includes a body portion 28 of insulating material which is counter-bored at 29 to receive two metallic electrode holders 30 of segmental form, the holders being separated by a non-conducting spacer plate 31. To each of the electrode holders is fixed a number of electrodes in the form of spaced pointed metallic needles 32 and 33, such needles passing through a cover plate 34 of insulating material. The needles are preferably as long and numerous as convenient. The parts 28 and 30 are clamped together by screws 35 and rest upon an insulating plate 36 to which, together with the plate 34, they are attached by the screws 27 which pass through the spacer plate 31. The lower piston is thus so constructed that the electrodes are thoroughly insulated from each other and from the frames.

The electrodes 32 are connected with a conductor 38 and the electrodes 33 with a conductor 39, the conductors passing through suitable apertures in the parts 28 and 36. The upper ends of the conductors may be soldered to the respective electrode holders 30, the conductors passing through the coil spring 23 as shown in Fig. 1 and through a passageway at the bottom of the frame 14 from which they lead to the resistance indicator or meter, which may be of any known type (not shown). If desired, the conductors 38 and 39 may lead to insulated terminals on the frame 14.

Extending from the socket member 22 is a pin 40 which passes through a slot 40ª in the frame 14. The pin is engaged by an arm 41 secured to the flange 41ª of the sleeve 41ᵇ rotatably mounted on a shaft 42. A pointer 43 is likewise fixed to the flange 41ª and cooperates with a scale 44 fastened to the frame 14. The shaft 42 is suitably mounted within a bearing supported by the frame 14, and is urged in a clockwise direction by means of a coil spring 45 to cause the arm 41 to be in constant engagement with the pin 40.

In the operation of our device, a suitable quantity of material to be tested, such as loose, cut tobacco, is placed within the ring 10, the latter being positioned as shown in Fig. 1, and tamped down by hand. The hand wheel 16 is then operated to bring the piston 12 to bear upon the material in the ring 10, the wheel being operated until the pressure to which the material is subjected reaches a predetermined value as indicated by the pointer 43 upon the scale 44. The electrical circuit of which the conductors 38 and 39 form a part is then closed and the resistance of the material across the electrodes 32 and 33 is then read or calculated from the indicating meter.

A pressure of 150 lbs. upon a two inch diameter sample of loose cut tobacco has been found to give consistent and satisfactory results as it substantially eliminates interstitial spaces and establishes the necessary continuity of pressure contact between the particles which lie between the electrodes and thus establishes a direct path for the electric current flowing from one set of electrodes to the other set. The size of the compressed sample or charge is determined by the size of the particles, shreds, bits, or pieces of material. In general, the sample must be large in comparison with the size of the particles; that is, for larger particles a larger sample is employed and vice versa. The degree of pressure to be applied may vary for different materials and for different degrees of comminution of the same material, it being only necessary for obtaining comparable results that the same pressure be used for the samples of the same material. The electrode needles are preferably long and numerous. Fewer needles could be used, but the larger the number of needles and the larger the area covered, the more accurate will be the results.

When the sample is not in equilibrium with the temperature and humidity of the room, it must be handled rapidly, the results being then slightly less accurate than when such equilibrium exists, but being satisfactory for many purposes.

For greater accuracy it is necessary to make temperature corrections and therefore to determine the temperature of the sample under test. We accordingly arrange a thermometer 46 upon the piston 12, the mercury bulb 47 of the thermometer projecting below the piston and being pointed in shape to reduce the resistance thereto as it penetrates the packed material in the ring 10. The thermometer is held in position on the piston 12 by a sleeve nut 48 and may be protected by a shield 13ª (Fig. 4). The temperature is measured with sufficient accuracy if the ring and pistons are near the sample temperature. They can be brought to the proper temperature by preliminary tests or by artificial heating or cooling. Being also poor conductors of heat, the ring and pistons do not gain or lose heat rapidly.

The plate 25 is preferably so adjusted by means of the bolts 25ª that the spring 23 is initially under a pressure of, say, 100 lbs., as illustrated, so that the piston does not move through too large a distance when the pressure is brought to 150 lbs. The pitch of the screw 15 is such that the critical angle of friction is approached, so that when the screw is turned down, it will remain in such position without a stop ratchet or a catch while the electrical readings are being made.

The success of our improved mode of testing the moisture content of materials by measuring their resistance depends to some extent upon the fact that rough measurements of resistance are sufficient to give fairly exact values of moisture content when the relation between the two quantities are known. This statement applies to various kinds of fibrous or comminuted material. For example, it has been found that in the case of wood the equation $$\frac{1}{a+\log R}=b+cw$$

where R is the resistance, $w$ the moisture content, and $a$, $b$ and $c$ are empirical constants, fits the data within experimental error. For grain a different equation $$\log \frac{1}{R}=a+bw$$

closely fits the data; that is when log $$\frac{1}{R}$$

is plotted against $w$, the curve is nearly a straight line over a wide range. This second equation is applicable also for tobacco over a limited range. The equations are applied only in the moisture range from fibre saturation to zero. From the above it will be evident that various forms of mechanism, for example for indicating directly or indirectly the electrical resistance, may be employed to give sufficiently accurate results and it is therefore thought to be unnecessary to describe any specific measuring or indicating device.

In the practical use of our improved device, no difficulty has been encountered from polarization. It has been found that, for example, in half moist tobacco, under moderate voltage and current, the travel of ions to the electrodes is very slow so that any polarization voltage that is built up by direct current is very slight. However, in isolated cases a reversing switch saves time and reduces the erosion of one set of electrode needles. As above indicated, the concomitant use of the thermometer and the making of suitable correction for variations in temperature may be adopted or omitted, as desired.

It will be understood that the number and length of the electrodes, and the spacing between individual electrodes and between the two sets of electrodes will affect the result registered by the indicating, measuring, or recording instrument, and that each particular instrument design will have to be calibrated against samples of known moisture content and its constants determined.

Various modifications of the specific embodiment of the invention shown and described may be resorted to within the scope of the appended claims without departing from the spirit of the invention. For example, the thermometer 46 may be mounted in the lower piston 11, or the electrodes may be supported by the upper piston 12. Also the lower piston may be stationary and the upper piston provided with the means for indicating the degree of compression of the sample. The thermometer 46 can be substituted by a thermo-couple and its indicator, while the screw device 15, 16 may be replaced by a lever and measured weight or other pressure-exerting means.

We claim:

1. In a moisture-testing device for loose fibrous or comminuted material, the combination of mechanism for compressing a quantity of such material to an approximately predetermined pressure, a pair of electrodes, each comprising a plurality of conductors insertable into the body of compressed material, for establishing electrical contact at spaced points within the body of such material and adapted to be connected with a measuring instrument, and an insulated base for supporting said electrodes.

2. In a moisture-testing device for loose fibrous or comminuted material, the combination of a receptacle for receiving and retaining in relatively stationary condition a quantity of material to be tested, means for compressing such quantity of material to approximately a predetermined pressure, and spaced metal electrodes electrically insulated from each other and adapted to be positioned within said material and to be connected with a resistance-indicating instrument.

3. The combination as set forth in claim 2, wherein said receptacle comprises a retaining ring, and wherein said compressing means comprises a bottom of non-conducting material for said ring, a movable piston, and means for forcing said piston into said ring to compress the material between such piston and bottom and pack the same about the electrodes.

4. In a moisture-testing device for loose fibrous or comminuted material, the combination of a hollow retaining ring adapted to receive a sample of material to be tested, a lower piston within said ring upon which said material rests, an upper piston, spaced, electrically insulated, pointed metal electrodes projecting from one of said pistons, means for moving one of said pistons to exert a predetermined pressure upon the material in said ring and pack such material about the electrodes, and conductors leading from said electrodes and adapted to be connected with a measuring instrument.

5. The combination as set forth in claim 4, wherein said lower piston rests upon a compression spring, and means for indicating the degree of compression of said spring.

6. The combination as set forth in claim 4, wherein said lower piston rests upon a compression spring, said spring being held in an initial state of compression of lower degree than the final compression of the sample of material, whereby the amount of movement performed by the lower piston when the sample is compressed to its predetermined pressure, is reduced.

7. The combination as set forth in claim 4, wherein said ring and pistons are made of electrically non-conducting material.

8. The combination as set forth in claim 4, including a temperature measuring means mounted in one of said pistons and arranged to penetrate the sample of material.

9. The combination as set forth in claim 4, wherein the electrode-carrying piston comprises a body of insulating material countersunk at one face thereof, said electrodes comprising segmental metal plates positioned within the countersink and having spaced needles projecting therefrom, an insulating plate within the countersink separating said metal plates, and a cover plate of insulating material overlying said metal plates and provided with apertures through which said needles pass.

10. In a moisture-testing device for loose fibrous or comminuted material, the combination of a retaining ring adapted to receive a sample of material to be tested, a lower piston and an upper piston, one of said pistons having two sets of pointed metal electrodes electrically insulated from each other, means for moving the pistons relatively to each other to compress the sample in the ring therebetween and thereby pack the material about the electrodes, means for indicating the pressure on said sample, and conductors leading from said electrodes and adapted to be connected with an indicating instrument.

11. The combination as set forth in claim 10, wherein said pressure-indicating means includes a spring arranged to be compressed as said sample is compressed, a scale, and a pointer playing over said scale and arranged to move in accordance with the compression of the spring.

12. In a moisture-testing device for loose fibrous or comminuted material, the combination of a frame, a hollow retaining ring within the frame adapted to receive a sample of material to be tested, a lower piston within said ring upon which said material rests, metallic needle electrodes projecting from said piston, a screw associated with said frame, a second frame suspended from said screw, an upper piston at the bottom of said second frame arranged to be forced by said screw to compress the material in the ring and thereby compact the material about the electrodes, said ring and pistons being made of insulating material, a thermometer supported by said upper piston and housed within said second frame, a spring beneath said lower piston, and means cooperating with the spring to indicate the degree of compression of the material.

13. In a moisture-testing device for loose fibrous or comminuted material, the combination of a hollow retaining ring adapted to receive a sample of material to be tested, a lower piston within said ring upon which said material rests, an upper piston, spaced, electrically insulated, pointed metal electrodes projecting from at least one of said pistons in the direction of the interior of the ring, means for moving one of said pistons to exert a predetermined pressure upon the material in said ring and pack such material about the electrodes, and conductors leading from said electrodes and adapted to be connected with a measuring instrument.

14. In a moisture-testing device for loose fibrous or comminuted material, the combination of a retaining ring adapted to receive a sample of material to be tested, a lower piston and an upper piston, two sets of pointed metal electrodes associated with said pistons and electrically insulated from each other, means for moving the pistons relatively to each other to compress the sample in the ring therebetween and thereby pack the material about the electrodes, means for indicating the pressure on said sample, and conductors leading from said electrodes and adapted to be connected with an indicating instrument.

15. In a moisture-testing device for loose fibrous or comminuted material, the combination of mechanism for compressing a quantity of such material to an approximately predetermined pressure, a pair of electrodes each comprising a plurality of conductors insertable into the body of compressed material for establishing electrical contact between spaced points within the body of compressed material and adapted to be connected with a measuring instrument, and means for indicating the degree of pressure exerted upon said material.

16. The method of testing the moisture content of loose fibrous or comminuted material which comprises maintaining a mass of such material at a substantially uniform pressure about a pair of spaced electrodes which project into the material, and then measuring the electrical resistance across the uniformly compacted material between the electrodes.

17. In a moisture-testing device for loose fibrous or comminuted material, the combination of mechanism for exerting an approximately uniform, predetermined pressure upon a mass of such material, electrodes adapted to project into the mass of uniformly compressed material, an insulated base for supporting said electrodes, and a measuring instrument connected to said electrodes and indicating the electrical resistance or conductivity only of the uniformly compacted material between the electrodes.

18. In a moisture-testing device for loose fibrous or comminuted material, the combination of a receptacle for receiving and retaining in relatively stationary condition a quantity of material to be tested, mechanism for placing such material under an approximately predetermined pressure, and electrodes for contacting the compressed material in spaced relation and adapted to be connected with a resistance-measuring instrument.

19. A process of determining the moisture content of a substance including the steps of compressing a charge of the substance under such a predetermined pressure as will substantially eliminate any interstitial spaces, maintaining said compressed charge stationary relatively to the areas of the application of the pressure, and measuring the electrical resistivity of the substance when so compressed while maintaining the pressure constant.

20. A process of determining the moisture content of a substance including the steps of compressing a charge of the substance in a comminuted state to a predetermined degree, maintaining said compressed charge stationary relatively to the areas of the application of the pressure, and measuring the electrical resistivity of the substance while maintaining the substance under said predetermined pressure.

21. A testing instrument for determining the moisture content of a substance, comprising a cup for receiving the substance to be tested, a member having substantially the same cross-sectional area as the cup and adapted to rest upon the substance to be tested, means for electrically connecting the material disposed within said cup in an electrical circuit with a resistance-measuring instrument, and means for exerting a predetermined pressure on the member to thus exert a predetermined pressure upon the substance being tested while its resistance is being measured.

22. A process of determining the moisture content of a substance including the steps of compressing a charge of a substance constituted of numerous individual units of the substance, under a predetermined pressure sufficient to establish a continuity of pressure contact between the said units, maintaining said units in a confined space under uniform pressure of the stated character and during such pressure confinement measuring the electrical resistivity of the substance.

23. A process of determining the moisture content of a substance including the steps of placing a charge of the substance between two electrodes within a confined space, compressing said charge under such a predetermined pressure as will compress the charge between the electrodes and establish in said compressed charge a substantially straight continuous path for electric current flowing from one electrode to the other, passing electric current through the charge during such pressure confinement and measuring the electric resistivity of the compressed substance while maintaining the pressure constant.

CHARLES O. FAIRCHILD.
JAMES P. HENDERSON.